United States Patent [19]
Foti

[11] Patent Number: 5,970,404
[45] Date of Patent: Oct. 19, 1999

[54] SYSTEM AND METHOD OF DETECTING AND PREVENTING FRAUDULENT TELEPHONE CALLS IN A RADIO TELECOMMUNICATIONS NETWORK

[75] Inventor: George Foti, Dollard des Ormeaux, Canada

[73] Assignee: Telefonaktiebolaget LM Ericsson, Stockholm, Sweden

[21] Appl. No.: 08/736,950

[22] Filed: Oct. 25, 1996

Related U.S. Application Data

[51] Int. Cl.$^6$ .................................................. H04M 11/00
[52] U.S. Cl. ........................ 455/410; 455/433; 455/456; 455/561
[58] Field of Search .................................. 455/410, 411, 455/422, 423, 426, 432, 433, 435, 456, 458, 560, 561

[56] References Cited

U.S. PATENT DOCUMENTS

| | | | |
|---|---|---|---|
| 4,764,919 | 8/1988 | Hunter et al. | 370/60 |
| 4,811,378 | 3/1989 | Else et al. | 379/189 |
| 4,955,049 | 9/1990 | Ghisler | 379/58 |
| 5,309,501 | 5/1994 | Kozik et al. | 379/58 |
| 5,351,290 | 9/1994 | Naeini et al. | 379/145 |
| 5,408,419 | 4/1995 | Wong | 455/433 |
| 5,420,910 | 5/1995 | Rudokas et al. | 379/59 |
| 5,463,681 | 10/1995 | Vaios et al. | 379/189 |
| 5,495,521 | 2/1996 | Rangachar | 379/95 |
| 5,699,407 | 12/1997 | Nguyen | 455/462 |
| 5,734,977 | 3/1998 | Sanmugam | 455/410 |

*Primary Examiner*—Willis R. Wolfe
*Assistant Examiner*—Hieu T. Vo
*Attorney, Agent, or Firm*—Steven W. Smith

[57] ABSTRACT

A system and method for detecting a fraudulent call origination in a radio telecommunications network having a subscriber's home Home Location Register (HLR) for storing a stored location for a mobile station, a serving Mobile Switching Center (MSC) in which the call origination is initiated, and a MSC-Location (MSC-L) covering the location for the mobile station stored in the home HLR. The serving MSC sends a reporting message to the home HLR when a call is originated from the mobile station in the serving MSC. The reporting message indicates a reported location for the mobile station. The home HLR then sends paging request messages to the serving MSC and the MSC-L requesting the serving MSC to page the mobile station in the reported location and requesting the MSC-L to page the mobile station in the stored location. Each MSC pages the mobile station and sends a paging result to the home HLR. The home HLR compares the stored location to the reported location, and analyzes the locations and the paging results to determine whether the call origination is fraudulent. If the call origination is determined to be fraudulent, the call is disconnected, and the mobile station is barred from originating calls until a proper personal identification number (PIN) code is entered.

30 Claims, 4 Drawing Sheets

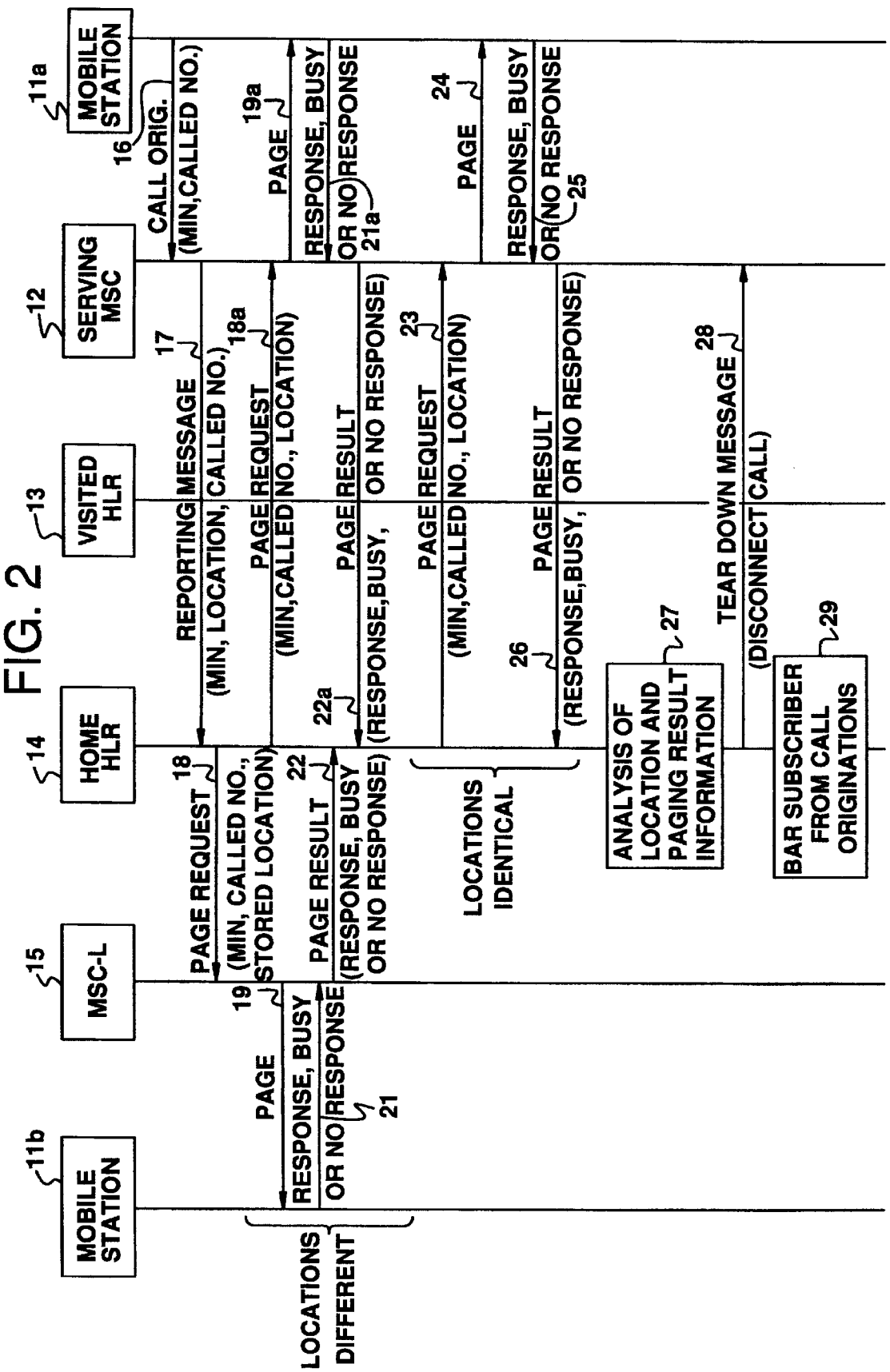

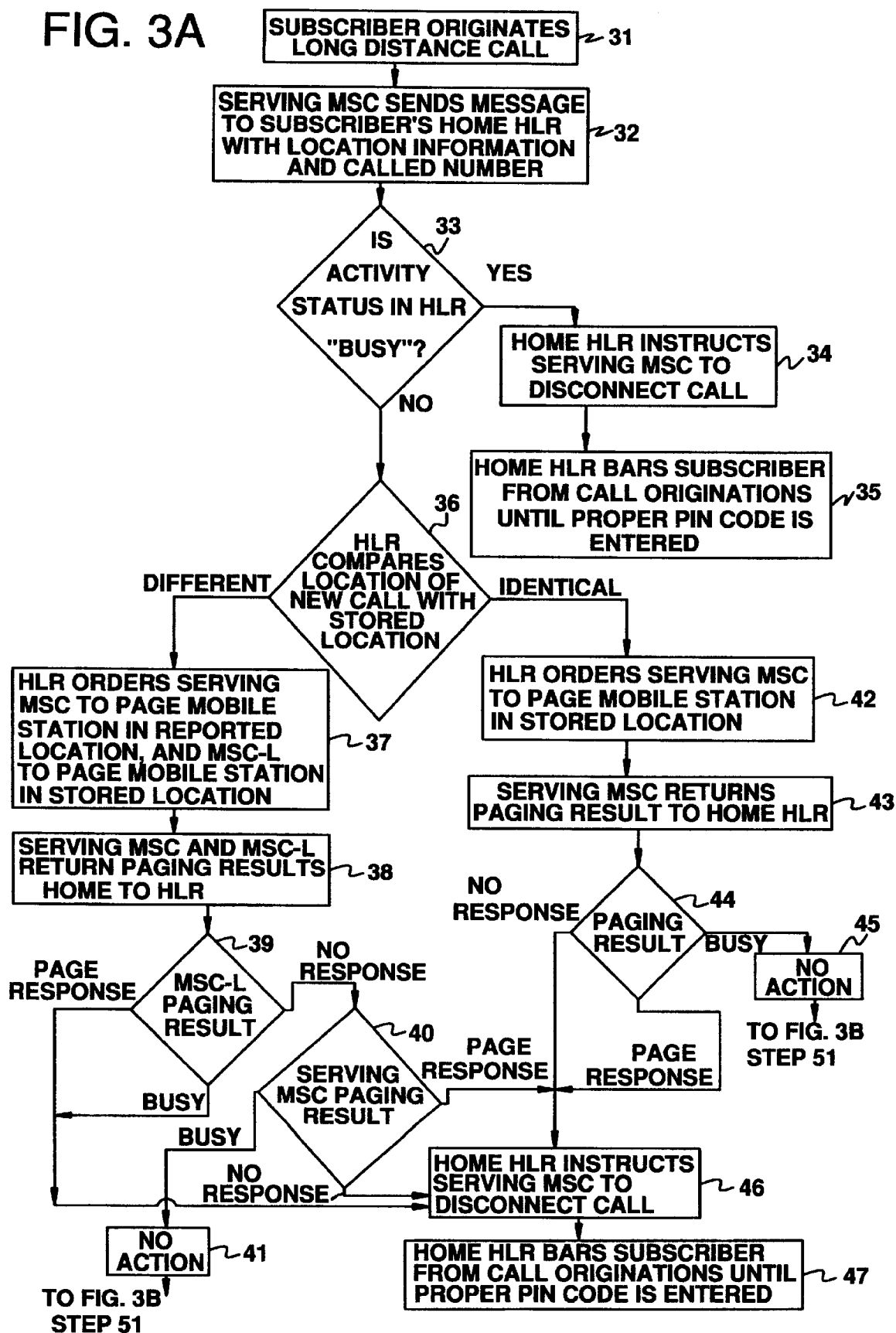

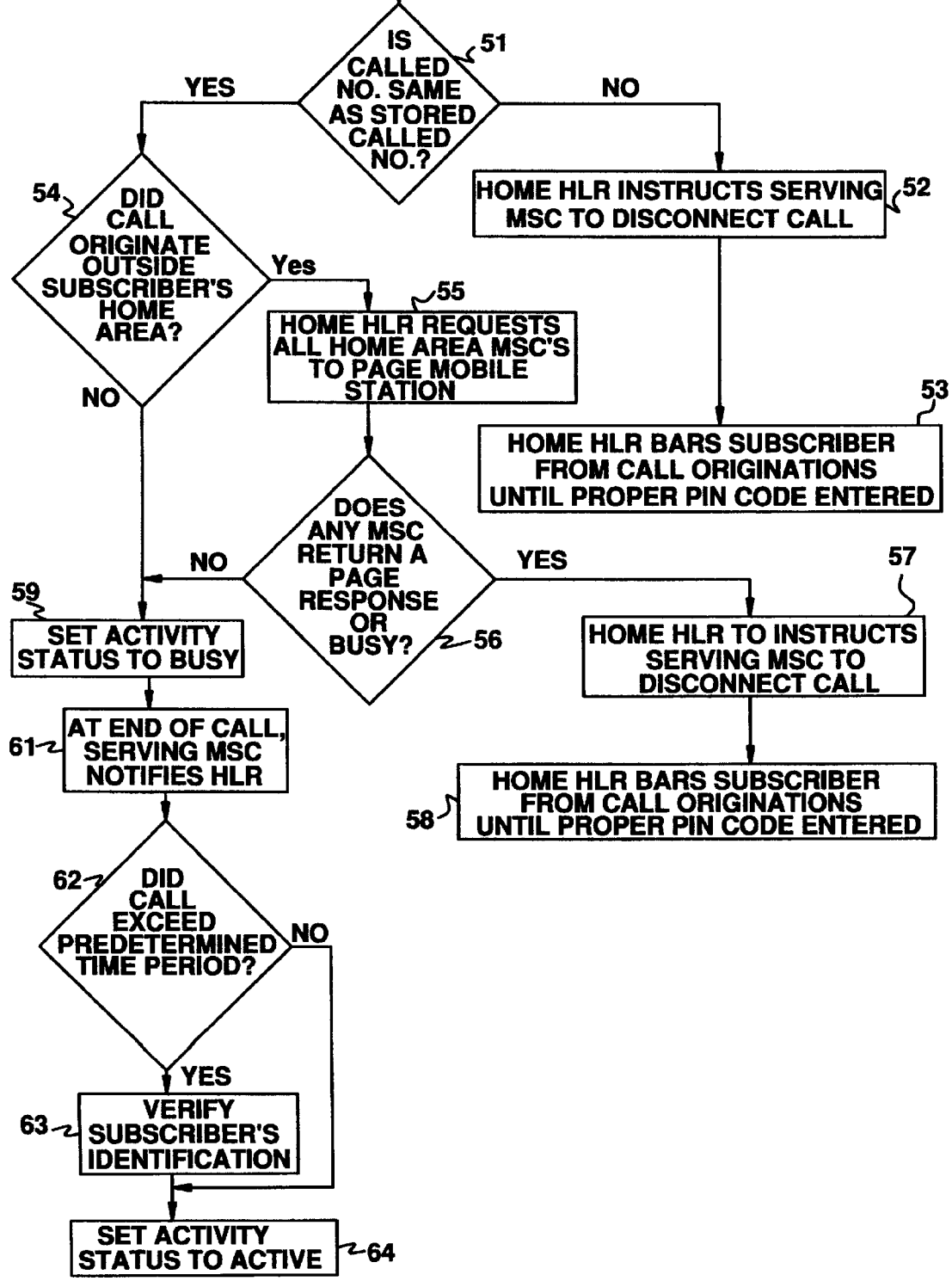

SYSTEM AND METHOD OF DETECTING AND PREVENTING FRAUDULENT TELEPHONE CALLS IN A RADIO TELECOMMUNICATIONS NETWORK

BACKGROUND OF THE INVENTION

1. Technical Field of the Invention

This invention relates to telecommunication systems and, more particularly, to a system and method of detecting and preventing fraudulent long distance telephone calls in a radio telecommunication system.

2. Description of Related Art

In existing radio telecommunications networks, fraudulent users may attempt to place free long distance telephone calls by causing the network to recognize the calls as being placed by a legitimate subscriber. Fraudulent users may clone the legitimate subscriber's mobile telephone, including the electronic serial number (ESN) and mobile identification number (MIN). Thereafter, the cloned telephone appears to the network to be the subscriber's legitimate telephone, thereby allowing a fraudulent user to place illegitimate long distance telephone calls.

Although there are no known prior art teachings of a solution to the aforementioned deficiency and shortcoming such as that disclosed herein, U.S. Pat. No. 4,955,049 to Ghisler discusses subject matter that bears some relation to matters discussed herein. Ghisler discloses a method of supervising subscribers in a mobile telephone system to detect fraudulent usage of a mobile telephone. Ghisler assigns a predetermined sequence of numbers to each mobile telephone in the system. Each time a call is made by a subscriber, the next number in the mobile telephone's assigned sequence is transmitted by the mobile station to the serving mobile switching center (MSC). The MSC records the numbers utilized, and detects a fraudulent call if there is a break in the sequence.

Ghisler, however, requires modification of each mobile station to store its assigned number sequence and transmit the next number in the sequence each time a call is made. It would be advantageous to have a method of detecting fraudulent telephone calls that does not require modification of the mobile station.

U.S. Pat. No. 5,309,501 to Kozik et al. (Kozik) discloses a modular switching system for detecting fraudulently identified mobile stations in a cellular mobile telecommunications network. Kozik is a switch-based fraud-detection system which examines a class of state transitions to see if a particular mobile station state transition is likely, in view of a recorded prior state of the mobile station. Unlikely state transitions are indications of possible fraud. Kozik, however, only works if the legitimate mobile station and the fraudulent mobile station are in the same location. The fraud detection algorithm utilized in Kozik assumes that there are two mobile stations in the same location, and finds an indication of fraud if both of the mobile stations are doing the same thing (i.e., going through the same state transition) in the same location.

A major disadvantage to the system and method of Kozik is that fraudulent mobile stations are often not in the same location as the legitimate mobile station. The switch-based system and method of Kozik will not detect fraudulent mobile stations operating in locations different from the legitimate mobile station, especially in the coverage area of another switch. Therefore, a system and method are needed that detects fraudulent mobile stations operating in locations different from the legitimate mobile station, and in the coverage area of different switches.

Review of each of the foregoing references reveals no disclosure or suggestion of a system or method such as that described and claimed herein.

In order to overcome the disadvantage of existing solutions, it would be advantageous to have a method of detecting fraudulent telephone calls in a radio telecommunications network that does not require modification of the mobile station, and that detects fraudulent mobile stations operating in locations different from the legitimate mobile station, and in the coverage area of different switches. The present invention provides such a method.

SUMMARY OF THE INVENTION

In one aspect, the present invention is a method of detecting a fraudulent call origination in a radio telecommunications network having a subscriber's home Home Location Register (HLR) for storing a stored location for a mobile station, a serving mobile switching center (MSC) in which the call origination is initiated, and a MSC-location (MSC-L) covering the location for the mobile station stored in the subscriber's home HLR. The method includes the steps of sending a reporting message from the serving MSC to the subscriber's home HLR when a call is originated from the mobile station in the serving MSC. The address of the reporting message indicates a reported location for the mobile station. The method then sends paging request messages from the home HLR to the MSC-L and the serving MSC requesting the MSC-L to page the mobile station in the stored location, and requesting the serving MSC to page the mobile station in the reported location. The MSC-L and the serving MSC page the mobile station and send paging results to the home HLR. The home HLR performs the steps of comparing the stored location to the reported location, and analyzing the stored location, the reported location, and the paging results from the serving MSC and the MSC-L to determine whether the call origination is fraudulent.

The step of comparing the stored location to the reported location may include determining whether the stored location and the reported location are identical. The step of analyzing the paging result to determine whether the call origination is fraudulent may include determining the call origination is fraudulent when the stored location and the reported location are identical, and the paging result from the serving MSC indicates that there was a page response from the mobile station, or no response was received from the mobile station, and the mobile station was not busy. Additionally, the call origination may be determined to be fraudulent when the stored location and the reported location are different, and the paging result from the MSC-L indicates that there was a page response from the mobile station, or there was no page response because the mobile station was busy.

In another aspect, the present invention is a system for detecting a fraudulent call origination from a mobile station in a radio telecommunications network having a plurality of mobile switching centers (MSCs) and a subscriber's home Home Location Register (HLR) which stores a stored location for the mobile station. The system includes a serving mobile switching center (MSC) in which the call origination is initiated, the serving MSC including means for sending a reporting message from the serving MSC to the home HLR when a long distance call is originated from the mobile station in the serving MSC. The address of the reporting message indicates a reported location for the mobile station.

The serving MSC includes means for paging the mobile station in the reported location, and means for sending a paging result from the serving MSC to the home HLR. The system also includes a MSC-location (MSC-L) providing radio coverage for the location for the mobile station stored in the home HLR. The MSC-L includes means for paging the mobile station in the stored location upon request from the home HLR, and means for sending a paging result from the MSC-L to the home HLR. The system also includes means within the home HLR for sending a paging request message to the serving MSC and to the MSC-L to page the mobile station in the stored location, means within the home HLR for comparing the stored location to the reported location, and means within the home HLR for analyzing the stored location and the reported location, and the paging result to determine whether the call origination is fraudulent.

BRIEF DESCRIPTION OF THE DRAWINGS

The invention will be better understood and its numerous objects and advantages will become more apparent to those skilled in the art by reference to the following drawing, in conjunction with the accompanying specification, in which:

FIG. 2 is a message signaling diagram illustrating the flow of messages between the nodes of a telecommunications network when performing the method of the present invention; and FIGS. 3A–3B are a flow chart illustrating the steps in the method of detecting and preventing fraudulent telephone calls, in accordance with the teachings of the present invention.

DETAILED DESCRIPTION OF EMBODIMENTS

Figure 1:
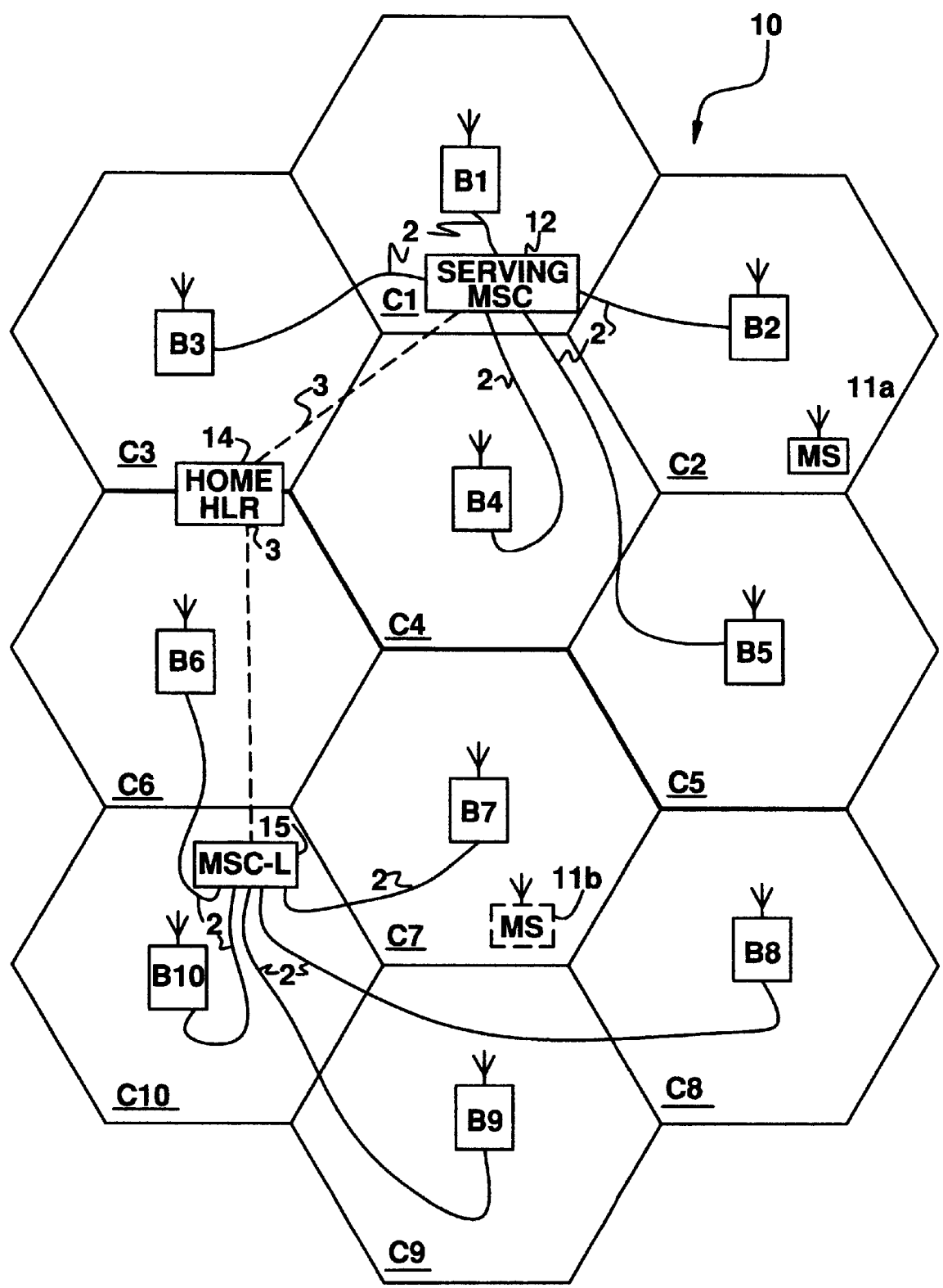
FIG. 1 is a block diagram illustrating components of a radio telecommunication network associated with the present invention.

FIG. 1 is a block diagram illustrating components of a radio telecommunication network associated with the present invention. In FIG. 1, an arbitrary geographic area may be divided into a plurality of continuous radio coverage areas, or cells C1–C5 associated with a first exchange, and cells C6–C10 associated with a second exchange. Although the system of FIG. 1 is illustratively shown to only include 10 cells, it should be clearly understood that in practice, the number of cells would be much larger.

Associated with and located within each of the cells C1–C10, is a base station designated as a corresponding one of a plurality of base stations B1–B10. Each of the base stations B1–B10 includes a transmitter, receiver, and a base station controller as are well known in the art. In FIG. 1, the base stations B1–B10 are selected to be located at the center of each of the cells C1–C10, respectively, and are equipped with omni-directional antennas. However, in other configurations of a radio telecommunications network, the base stations B1–B10 may be located near the periphery, or otherwise away from the centers of the cells C1–C10 and may illuminate the cells C1–C10 with radio signals either omni-directionally or directionally. Therefore, the representation of the radio telecommunications network of FIG. 1 is for purposes of illustration only and is not intended as a limitation on the possible implementations of a mobile radio telecommunication system within which a mobility restriction process may be implemented. The base stations B1–B5 are connected by communication links 2 (e.g., cables, microwave links, etc.) to a serving mobile switching center (MSC) 12. The base stations B6–B10 are connected by communication links 2 to a MSC-Location (MSC-L) 15. The relevant connections between the serving MSC 12, the MSC-L 15, and the base stations B1–B10 are not completely shown in FIG. 1 but are well known to those of ordinary skill in the art.

With continuing reference to FIG. 1, a mobile station 11a is illustrated within cell C2, and a mobile station 11b is illustrated within cell C7. Mobile station 11b is illustrated in phantom since, in the discussion herein, it is initially unknown whether mobile station 11b is actually mobile station 11a or a fraudulent mobile station. Only two mobile stations are shown in FIG. 1, but it should be understood that the actual number of mobile stations will be much larger and, in practice, will invariably greatly exceed the number of base stations. Moreover, mobile stations 11a and 11b are illustrated in only some of the cells C1–C10. The presence or absence of mobile stations in any particular one of the cells C1–C10 should be understood to depend, in practice on the individual desires of subscribers utilizing the mobile stations 11a and 11b. Subscribers may roam from one location in a cell to another, or from one cell to an adjacent cell or neighboring cell, and even from one exchange served by a MSC to another such exchange all the while receiving and placing calls both within the radio telecommunications network 10 as well as the public switch telecommunication network (PSTN) which is connected to the radio telecommunications network through its MSCs.

Each of the mobile stations 11a and 11b is capable of initiating or receiving a telephone call through one or more of the base stations B1–B10 and the serving MSC 12 or the MSC-L 15. Such calls may be either for voice or data communications. Each of the cells C1–C10 is allocated a plurality of voice or speech channels and at least one access or control channel, such as a forward control channel (FOCC). The control channel is used to control or supervise the operation of the mobile station by means of information transmitted and received from those units, referred to as messages. Control and administration messages within the radio telecommunications network are sent in accordance with industry established air interface standards, such as AMPS and EIA/TIA 553, the standards for analog cellular operations, and/or D-AMPS, IS-54B, and IS-54C, the standards for digital cellular operations, all of which are hereby incorporated by reference herein. While these standards govern operations in North America and selected other regions, similar standards govern other geographic areas throughout the world, and are well known to those skilled in the art.

The information exchanged between base stations and mobile stations via messages, may include incoming call signals, outgoing call signals, paging signals, paging response signals, location registration signals, voice channel assignments, maintenance instructions and handoff instructions as the mobile stations travel out of the radio coverage of one cell and into the radio coverage of other cells, as well as other additional items of information such as calling party numbers, time information, and the like. The control or voice channels may operate in either analog or digital mode or a combination thereof based upon industry standards. Integrated services between different exchanges are provided by using the intersystem specification IS-41, which is hereby incorporated by reference herein.

Subscriber profile information, location information, and status information for each mobile subscriber is stored in an associated home Home Location Register (home HLR) 14. The home HLR 14 is connected by signaling lines 3 to the serving MSC 12 and the MSC-L 15. The present invention is a home HLR-based fraud-detection system and method in which the subscriber's home HLR 14 is programmed to recognize situations in which on-going calls may be determined to be fraudulent. In such cases, the on-going calls are disconnected, and the fraudulent user is prevented from making further calls. The legitimate subscriber may access the network and place calls after entering a proper personal identification number (PIN) code.

FIG. 2 is a message signaling diagram illustrating the flow of messages between the nodes of a telecommunications network when performing the method of the present invention. The telecommunications network includes mobile stations 11a and 11b (which may be one mobile station in two possible locations), a serving mobile switching center (serving MSC) 12, a visited home location register (visited HLR) 13, a subscriber's home HLR 14, and a MSC-location (MSC-L) 15 which covers the location that is stored in the home HLR 14 as the location of the mobile station 11.

When a long distance telephone call 16 is originated utilizing mobile station 11a, the MSC which handles that call (the serving MSC 12) sends a reporting message 17 to the subscriber's home HLR 14 and includes the called telephone number which is stored in both the serving MSC 12 and the home HLR 14. The address of the reporting message 17 indicates the mobile station's location. The home HLR 14 compares the location information from the reporting message 17 with information stored in the home HLR 14 regarding the location and status of the mobile station 11a. This comparison may result in six different cases:

(1) The mobile station's newly reported location is identical to the stored location in the home HLR, and the mobile station's status in the home HLR is inactive;

(2) The mobile station's newly reported location is identical to the stored location in the home HLR, and the mobile station's status in the home HLR is active;

(3) The mobile station's newly reported location is identical to the stored location in the home HLR, and the mobile station's status in the home HLR is busy;

(4) The mobile station's newly reported location is different from the stored location in the home HLR, and the mobile station's status in the home HLR is inactive;

(5) The mobile station's newly reported location is different from the stored location in the home HLR, and the mobile station's status in the home HLR is active; and (6) The mobile station's newly reported location is different from the stored location in the home HLR, and the mobile station's status in the home HLR is busy.

If the mobile station's status is busy, there is an immediate indication of fraud since a single mobile station cannot be engaged in an ongoing call and originate a new call at the same time. If the mobile station's status is active or inactive, the process continues.

If the mobile station's newly reported location is different from the stored location in the home HLR, the home HLR 14 then sends a paging request message 18 to the MSC-L 15 which covers the location that is stored in the home HLR as the location of the mobile station. The mobile station in this location is illustrated as mobile station 11b, but is considered by the network to be mobile station 11a at this time. The paging request message 18 requests the MSC-L to page the subscriber's mobile station 11b in the location that is stored in the home HLR 14. The home HLR 14 also sends a paging request message 18a to the serving MSC 12 which covers the reported location of the mobile station 11a. The paging request message 18a requests the serving MSC to page the subscriber's mobile station 11a in the reported location. The MSC-L 15 pages the mobile station 11b in the stored location at 19 and receives either a response or no response at 21. If there is no response from the mobile station, the MSC-L searches within its own records for a subscriber record indicating that the mobile station is currently engaged in a call (i.e., a "busy-marked" record). If a busy-marked record is found, the MSC-L 15 returns a busy indication to the home HLR 14 in the paging return result 22. If a busy-marked record is not found, the MSC-L 15 returns a no response indication (i.e., the mobile station 11b is inactive) to the home HLR 14 in the paging return result 22. Whenever a page response is received from the mobile station, the MSC-L returns a page response indication in the paging return result 22 without any attempt to locate a subscriber record. For clarity hereafter, whenever it is stated that the mobile station returns a "busy indication", it is understood that the mobile station does not respond to the page, and the paging MSC finds a busy-marked subscriber record. Likewise, "no response" from the mobile station indicates that the mobile station does not respond to the page, and the paging MSC does not find a busy-marked subscriber record. Additionally, a "page response" indicates that a page response is received from the mobile station, and the paging MSC returns a page response indication in the paging return result without any attempt to locate a subscriber record.

At or near the same time that the MSC-L 15 pages the mobile station 11b in the stored location, the serving MSC 12 pages the mobile station 11a in the reported location at 19a. The serving MSC receives either a response, a busy indication, or no response from the mobile station 11a at 21a. The MSC-L 15 returns the result to the home HLR at 22, and the serving MSC returns the result to the home HLR at 22a.

Anytime a busy indication is returned in the paging return result message, the return result message includes the called number to which the mobile station is connected. A called number that is different from the new call 16 is an indication of fraud. Additionally, if multiple page responses are received, there is an indication of fraud.

When the mobile station's newly reported location is identical to the stored location in the home HLR 14, the home HLR sends a paging request message 23 to the serving MSC 12. The serving MSC 12 pages the mobile station at 24 even though a call has just been originated by the mobile station within the serving MSC. Bordering systems are also paged in accordance with standard paging procedures. The serving MSC receives a response, a busy indication, or no response, at 25 and returns the page result 26 to the home HLR 14. If the response is a busy indication, the serving MSC includes in the return result message, the called number to which the mobile station is connected.

The home HLR 14 then analyzes at 27 the reported and stored location information and the returned paging result 22 or 26 in order to determine whether the new call 16 is fraudulent. The analysis when the locations are different is shown in Table 1 below.

TABLE 1

| LOCATION | RETURNED PAGING RESULT (MSC-L) | RETURNED PAGING RESULT (SERVING MSC) | CONCLUSION |
|---|---|---|---|
| Different | Page Response | Page Response | FRAUD |
| Different | Page Response | Busy | FRAUD |

TABLE 1-continued

| LOCATION | RETURNED PAGING RESULT (MSC-L) | RETURNED PAGING RESULT (SERVING MSC) | CONCLUSION |
| --- | --- | --- | --- |
| Different | Page Response | No Response | FRAUD |
| Different | Busy | Page Response | FRAUD |
| Different | Busy | Busy | FRAUD |
| Different | Busy | No Response | FRAUD |
| Different | No Response | Page Response | FRAUD |
| Different | No Response | Busy | Not Determined |
| Different | No Response | No Response | FRAUD |

The analysis when the locations are identical is shown in Table 2 below.

TABLE 2

| LOCATION | RETURNED PAGING RESULT (SERVING MSC) | CONCLUSION |
| --- | --- | --- |
| Identical | No Response | FRAUD |
| Identical | Page Response | FRAUD |
| Identical | Busy | Not Determined |

In cases in which the home HLR 14 determines that the call 16 is fraudulent, the home HLR may at that point instruct the serving MSC 12 to tear down (disconnect) the call at 28. The tear-down message 28 is a new message in IS-41. In existing systems, the network operator must manually intervene to disconnect a call. The home HLR 14 then bars mobile station 11a and 11b from originating any further calls at 29 until the subscriber enters a proper PIN code. If fraud cannot be determined because a busy indication is received from the serving MSC 12, as per the cases in Tables 1 & 2, no action is taken, and the home HLR continues its analysis by analyzing the called telephone number which is sent to the home HLR with the paging return result whenever the mobile station is busy.

When the mobile station 11a originates a telephone call, the called telephone number is stored in the subscriber's record in the home HLR 14. The home HLR 14 may then compare the called telephone number stored in the subscriber's record with the called telephone number returned to the home HLR in the paging return result message whenever the mobile station is busy.

The home HLR 14 may next order all of the MSCs in the subscriber's home area to page for the mobile station. If the call originated outside the subscriber's home area, but there is either a page response or a busy indication from the mobile station in one of the home area MSCs, then the home HLR determines that there is fraud, and orders the serving MSC to disconnect the call. If the call originated outside the subscriber's home area, and none of the home area MSCs return a page response or a busy indication from the mobile station, or if the call originated within the subscriber's home area, then the system cannot conclude that there is fraud. The home HLR 14 then sets the activity status for the mobile station to busy.

Finally, at the conclusion of the suspect call, the serving MSC notifies the home HLR of the call's completion. The call may be timed, and if the length of the call exceeds a predetermined time period, the network operator may call the subscriber after the completion of the call to verify the subscriber's identification. Alternatively, the network may automatically require the subscriber to enter a PIN code before making any further calls. This step may be implemented after all lengthy long distance calls, or whenever the mobile station activity indication in the home HLR is inactive and the mobile station originates a call. The home HLR then sets the activity status of the mobile station to active.

FIGS. 3A–3B are a flow chart illustrating the steps in the method of detecting and preventing fraudulent telephone calls, in accordance with the teachings of the present invention. Beginning with FIG. 3A, step 31, a subscriber originates a long distance call 16 utilizing the mobile station 11a. At step 32, the serving MSC 12 sends a reporting message to the subscribers home HLR 14. At step 33, the home HLR checks the stored activity status for the mobile station 11a to determine whether or not the activity status is busy. If the stored activity status is busy, there is an indication of fraud, and the home HLR instructs the serving MSC 12 to disconnect the call 16 at step 34. The home HLR then bars the subscriber from futher call originations at step 35 until a proper PIN code is entered. If the stored activity status is not busy, the method moves to step 36 where the home HLR compares the reported location with the subscriber's stored location in the home HLR and determines whether the locations are different or identical. If the locations are different, the method moves to step 37 where the home HLR 14 orders the serving MSC 12 to page the subscriber's mobile station 11a, and orders the MSC-L 15 to page the mobile station 11b in the stored location. The serving MSC and the MSC-L page the mobile station and return the paging results to the home HLR at step 38.

At step 39 the paging result from the MSC-L 15 is analyzed in the home HLR 14. If a page response or busy indication was received, then the method determines that the call is fraudulent, and moves to step 46 where the home HLR 14 instructs the serving MSC 12 to disconnect the call. The method then moves to step 47 where the home HLR 14 bars the subscriber from call originations until a proper PIN code is entered. If, however, the paging result at 39 indicates no response, the method moves to step 40 and analyzes the paging result from the serving MSC 12. If no response or a page response is received, then the method determines that the call is fraudulent, and moves to step 46 where the home HLR 14 instructs the serving MSC 12 to disconnect the call. The method then moves to step 47 where the home HLR 14 bars the subscriber from call originations until a proper PIN code is entered. If, however, the paging result at 40 is a busy indication, the method moves to step 41 where no action is taken since it cannot be determined whether the call is fraudulent. The method then moves from step 41 to FIG. 3B, step 51 and continues its analysis.

If the locations are determined to be identical at step 36, the method moves to step 42 where the home HLR orders the serving MSC 12 to page the mobile station in the stored/reported location. The serving MSC pages the mobile station and returns the paging result to the home HLR at step 43. At step 44 the paging result is analyzed in the home HLR 14. If a busy indication was received, then the method moves to step 45 where no action is taken since it cannot be determined whether the call is fraudulent. The method then moves to FIG. 3B, step 51 and continues its analysis. If, however, the paging result at 43 indicates no response or a page response, the method determines that the call is fraudulent, and moves to step 46 where the home HLR 14 instructs the serving MSC 12 to disconnect the call. The method then moves to step 47 where the home HLR 14 bars the subscriber from call originations until a proper PIN code is entered.

From FIG. 3A, step 41 or step 45, the method moves to FIG. 3B, step 51 where the home HLR 14 determines whether or not the called number in the paging return result is the same as the called number stored in the HLR. If the called numbers are different, there is an indication of fraud, and the method moves to step 52 where the home HLR instructs the serving MSC 12 to disconnect the call. The method then moves to step 53 where the home HLR bars the subscriber from making any further call originations until the subscriber has entered a proper PIN code.

If, however, at step 51 the called numbers are the same, the method moves to step 54 where it is determined whether or not the call 16 originated outside the subscribers home area. If the call originated outside the subscriber's home area, the home HLR 14 requests all of the MSCs in the home area to page the mobile station at step 55. The home area MSCs then page the mobile station and return their paging results to the home HLR 14. At step 56, the home HLR analyzes the paging results and determines whether any of the home area MSCs returned either a page response or a busy indication. If either a page response or a busy indication was returned, the method moves to step 57 where the home HLR instructs the serving MSC 12 to disconnect the call. The method then moves to step 58 where the home HLR bars the subscriber from making any further call originations until the subscriber has entered a proper PIN code.

If, however, at step 54 the call did not originate outside the subscriber's home area, the method moves to step 59. Likewise, if none of the home area MSCs return a page response or busy indication, the method moves to step 59 where the activity status for the mobile station is set to busy. The method then moves to step 61 where, at the end of the call 16, the serving MSC 12 notifies the home HLR of the length of the call. At step 62, the home HLR compares the length of the call against a predetermined time period. If the length of the call exceeded the predetermined time period, the method moves to step 63 where the subscriber's identity is verified by the network operator. The home HLR then sets the mobile station's activity status to active at 64. If, however, at step 62, it is determined that the length of the call did not exceed the predetermined time period, the method moves directly to step 64 where the home ILR sets the mobile station's activity status to active.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A method of detecting a fraudulent call origination in a radio telecommunications network having a subscriber's home Home Location Register (HLR) for storing an activity status indication for the subscriber's mobile station, and a serving Mobile Switching Center (MSC) in which said call origination is initiated, said method comprising the steps of:

sending a reporting message from said serving MSC to said home HLR when a call is originated from said mobile station in said serving MSC;

determining whether said stored activity status indication is busy; and determining that said call origination is fraudulent upon determining that said stored activity status indication is busy.

2. The method of detecting a fraudulent call origination in a radio telecommunications network of claim 1 further comprising the step of instructing said serving MSC to disconnect said call origination.

3. The method of detecting a fraudulent call origination in a radio telecommunications network of claim 1 further comprising the step of barring said subscriber from originating calls until said subscriber enters a proper personal identification number (PIN) code.

4. A method of detecting a fraudulent call origination in a radio telecommunications network having a subscriber's home Home Location Register (HLR) for storing a stored location for a mobile station, and a plurality of Mobile Switching Centers (MSCs) including a serving (MSC) in which said call origination is initiated, and a MSC-Location (MSC-L) covering the location for the mobile station stored in said subscriber's home HLR, said method comprising the steps of:

sending a reporting message from said serving MSC to said home HLR when a call is originated from said mobile station in said serving MSC, said reporting message indicating a reported location for said mobile station and including a called telephone number;

comparing said stored location to said reported location;

sending a paging request message from said home HLR to said MSC-L requesting said MSC-L to page said mobile station in said stored location when said stored location is different from said reported location;

paging said mobile station in said stored location;

sending a paging result from said MSC-L to said home HLR;

sending a paging request message from said home HLR to said serving MSC requesting said serving MSC to page said mobile station in said reported location;

paging said mobile station in said reported location;

sending a paging result from said serving MSC to said home HLR; and analyzing said stored location and said reported location, and said paging results from said serving MSC and said MSC-L to determine whether said call origination is fraudulent.

5. The method of detecting a fraudulent call origination in a radio telecommunications network of claim 4 wherein said step of analyzing said stored location and said reported location, and said paging results from said serving MSC and said MSC-L to determine whether said call origination is fraudulent includes determining said call origination is fraudulent when said stored location and said reported location are different, and said paging result from said MSC-L is a page response from said mobile station.

6. The method of detecting a fraudulent call origination in a radio telecommunications network of claim 4 wherein said step of analyzing said stored location and said reported location, and said paging results from said serving MSC and said MSC-L to determine whether said call origination is fraudulent includes determining said call origination is fraudulent when said stored location and said reported location are different, and said paging result from said MSC-L is a busy indication from said mobile station.

7. The method of detecting a fraudulent call origination in a radio telecommunications network of claim 4 further comprising the step of disconnecting the call origination upon determining that said call origination is fraudulent.

8. The method of detecting a fraudulent call origination in a radio telecommunications network of claim 4 further comprising the step of barring call originations from said mobile station upon determining that said call origination is fraudulent, until a proper personal identification number (PIN) code is entered.

9. The method of detecting a fraudulent call origination in a radio telecommunications network of claim 4 further comprising the steps of:

storing in said home HLR, a called number for each call in progress;

determining whether the called number reported in said reporting message is identical to the called number stored in the home HLR for the call origination; and disconnecting the call origination upon determining that the called number reported in said reporting message is different from the called number stored in the home HLR for the call origination.

10. The method of detecting a fraudulent call origination in a radio telecommunications network of claim 9 further comprising the steps of:

determining whether the call origination originated outside the subscriber's home area, upon determining that the called number reported in said reporting message is identical to the called number stored in the home HLR for the call origination;

sending a page request messsage from said home HLR to all MSCs in the subscriber's home area, upon determining that said call origination originated outside the subscriber's home area;

determining whether any of said MSCs in the subscriber's home area returned a page response from said mobile station;

disconnecting the call origination upon determining that one or more of said MSCs in the subscriber's home area returned a page response;

determining whether any of said MSCs in the subscriber's home area returned a busy indication from said mobile station; and disconnecting the call origination upon determining that one or more of said MSCs in the subscriber's home area returned a busy indication.

11. The method of detecting a fraudulent call origination in a radio telecommunications network of claim 9 further comprising the steps of:

determining whether the call origination originated outside the subscriber's home area, upon determining that the called number reported in said reporting message is identical to the called number stored in the home HLR for the call origination;

setting an activity status for said subscriber to Busy in said home HLR;

sending, when said call origination has ended, a message from said serving MSC notifying said home HLR of a length of said call origination;

determining in said home HLR whether said call origination exceeded a predetermined time period;

verifying the subscriber's identification upon determining that said call origination exceeded the predetermined time period; and setting said activity status for said subscriber to Active in said home HLR.

12. A method of detecting a fraudulent call origination in a radio telecommunications network having a subscriber's home Home Location Register (HLR) for storing a stored location for a mobile station, and a serving Mobile Switching Center (MSC) in which said call origination is initiated, said method comprising the steps of:

sending a reporting message from said serving MSC to said home HLR when a call is originated from said mobile station in said serving MSC, said reporting message indicating a reported location for said mobile station and including a called telephone number;

comparing said stored location to said reported location;

sending a paging request message from said home HLR to said serving MSC requesting said serving MSC to page said mobile station in said stored location when said stored location is identical to said reported location;

paging said mobile station in said stored location;

sending a paging result from said serving MSC to said home HLR; and analyzing said stored location and said reported location, and said paging result from said serving MSC to determine whether said call origination is fraudulent.

13. The method of detecting a fraudulent call origination in a radio telecommunications network of claim 12 wherein said step of comparing said stored location to said reported location includes determining whether said stored location and said reported location are identical.

14. The method of detecting a fraudulent call origination in a radio telecommunications network of claim 13 wherein said step of analyzing said stored location and said reported location, and said paging result from said serving MSC to determine whether said call origination is fraudulent includes determining said call origination is fraudulent when said stored location and said reported location are identical, and said paging result from said serving MSC indicates that there was no response from said mobile station.

15. The method of detecting a fraudulent call origination in a radio telecommunications network of claim 13 wherein said step of analyzing said stored location and said reported location, and said paging result from said serving MSC to determine whether said call origination is fraudulent includes determining said call origination is fraudulent when said stored location and said reported location are identical, and said paging result from said serving MSC indicates that there was a page response from said mobile station.

16. The method of detecting a fraudulent call origination in a radio telecommunications network of claim 12 further comprising the steps of:

storing in said home HLR, a called nunber for each call in progress;

determining whether the called number reported in said reporting message is identical to the called number stored in the home HLR for the call origination; and disconnecting the call origination upon determining that the called number reported in said reporting message is different from the called number stored in the home HLR for the call origination.

17. The method of detecting a fraudulent call origination in a radio telecommunications network of claim 16 further comprising the steps of:

determining whether the call origination originated outside the subscriber's home area, upon determining that the called number reported in said reporting message is identical to the called number stored in the home HLR for the call origination;

sending a page request messsage from said home HLR to all MSCs in the subscriber's home area, upon determining that said call origination originated outside the subscriber's home area;

determining whether any of said MSCs in the subscriber's home area returned a page response from said mobile station;

disconnecting the call origination upon determining that one or more of said MSCs in the subscriber's home area returned a page response;

determining whether any of said MSCs in the subscriber's home area returned a busy indication from said mobile station; and disconnecting the call origination upon determining that one or more of said MSCs in the subscriber's home area returned a busy indication.

18. The method of detecting a fraudulent call origination in a radio telecommunications network of claim 16 further comprising the steps of:

determining whether the call origination originated outside the subscriber's home area, upon determining that the called number reported in said reporting message is identical to the called number stored in the home HLR for the call origination;

setting an activity status for said subscriber to Busy in said home HLR;

sending, when said call origination has ended, a message from said serving MSC notifying said home HLR of a length of said call origination;

determining in said home HLR whether said call origination exceeded a predetermined time period;

verifying the subscriber's identification upon determining that said call origination exceeded the predetermined time period; and setting said activity status for said subscriber to Active in said home HLR.

19. A system for detecting a fraudulent call origination in a radio telecommunications network having a subscriber's home Home Location Register (HLR) for storing an activity status indication for the subscriber's mobile station, and a serving Mobile Switching Center (MSC) in which said call origination is initiated, said system comprising:

a reporting means for sending a reporting message from said serving MSC to said home HLR when a call is originated from said mobile station in said serving MSC;

means within said home HLR for determining whether said stored activity status indication is busy; and means within said home HLR for determining that said call origination is fraudulent upon determining that said stored activity status indication is busy.

20. The system for detecting a fraudulent call origination in a radio telecommunications network of claim 19 further comprising means for instructing said serving MSC to disconnect said call origination.

21. The system for detecting a fraudulent call origination in a radio telecommunications network of claim 19 further comprising means for barring said subscriber from originating calls until said subscriber enters a proper personal identification number (PIN) code.

22. A system for detecting a fraudulent call origination from a mobile station in a radio telecommunications network having a plurality of Mobile Switching Centers (MSCs) and a subscriber's home Home Location Register (HLR) which stores a stored location for said mobile station, said system comprising:

a serving Mobile Switching Center (MSC) in which said call origination is initiated, said serving MSC including:

means for sending a reporting message from said serving MSC to said home HLR when a call is originated from said mobile station in said serving MSC, said reporting message indicating a reported location for said mobile station; and means for sending a paging result from said serving MSC to said home HLR;

means within said home HLR for comparing said stored location to said reported location;

a MSC-Location (MSC-L) providing radio coverage for the location for the mobile station stored in said home HLR, said MSC-L including:

means for paging said mobile station in said stored location; and means for sending a paging result from said MSC-L to said home HLR;

means within said home HLR for sending a paging request message to said MSC-L to page said mobile station in said stored location;

means within said home HLR for sending a paging request message to said serving MSC to page said mobile station in said reported location; and means within said home HLR for analyzing said stored location and said reported location, and said paging results from said MSC-L and said serving MSC to determine whether said call origination is fraudulent.

23. The system for detecting a fraudulent call origination in a radio telecommunications network of claim 22 wherein said means for analyzing said stored location and said reported location, and said paging result to determine whether said call origination is fraudulent includes means for determining said call origination is fraudulent when said stored location and said reported location are different, and said paging result from said MSC-L is a page response from said mobile station.

24. The system for detecting a fraudulent call origination in a radio telecommunications network of claim 22 wherein said means for analyzing said stored location and said reported location, and said paging result to determine whether said call origination is fraudulent includes means for determining said call origination is fraudulent when said stored location and said reported location are different, and said paging result from said MSC-L is a busy indication from said mobile station.

25. The system for detecting a fraudulent call origination in a radio telecommunications network of claim 22 further comprising means for disconnecting the call origination upon determining that said call origination is fraudulent.

26. The system for detecting a fraudulent call origination in a radio telecommunications network of claim 22 further comprising means for barring call originations from said mobile station upon determining that said call origination is fraudulent, until a proper personal identification number (PIN) code is entered.

27. A system for detecting a fraudulent call origination from a mobile station in a radio telecommunications network having a plurality of Mobile Switching Centers (MSCs) and a subscriber's home Home Location Register (HLR) which stores a stored location for said mobile station, said system comprising:

a serving Mobile Switching Center (MSC) in which said call origination is initiated, said serving MSC including:

means for sending a reporting message from said serving MSC to said home HLR when a call is originated from said mobile station in said serving MSC, said reporting message indicating a reported location for said mobile station; and means for sending a paging result from said serving MSC to said home HLR;

means within said home HLR for comparing said stored location to said reported location;

means within said home HLR for sending a paging request message to said serving MSC to page said mobile station in said reported location when said stored location is identical to said reported location; and means within said home HLR for analyzing said stored location and said reported location, and said paging result from said serving MSC to determine whether said call origination is fraudulent.

28. The system for detecting a fraudulent call origination in a radio telecommunications network of claim 27 wherein said means for comparing said stored location to said reported location includes means for determining whether said stored location and said reported location are identical.

29. The system for detecting a fraudulent call origination in a radio telecommunications network of claim 28 wherein said means for analyzing said stored location and said reported location, and said paging result to determine whether said call origination is fraudulent includes means for determining said call origination is fraudulent when said stored location and said reported location are identical, and said paging result indicates that there was no response from said mobile station.

30. The system for detecting a fraudulent call origination in a radio telecommunications network of claim 28 wherein said means for analyzing said stored location and said reported location, and said paging result to determine whether said call origination is fraudulent includes means for determing said call origination is fraudulent when said stored location and said reported location are identical, and said paging result indicates that a page response was received from said mobile station.

* * * * *

UNITED STATES PATENT AND TRADEMARK OFFICE
CERTIFICATE OF CORRECTION

PATENT NO. : 5,970,404
DATED : October 19, 1999
INVENTOR(S) : George Foti

It is certified that error appears in the above-identified patent and that said Letters Patent is hereby corrected as shown below:

Column 5, Line 51, delete "caimot" and substitute - - - cannot - - -.

Signed and Sealed this

Fifth Day of December, 2000

Attest:

Attesting Officer

Q. TODD DICKINSON

Director of Patents and Trademarks